United States Patent [19]

Aubourg et al.

[11] Patent Number: 5,662,085

[45] Date of Patent: Sep. 2, 1997

[54] METHOD AND DEVICE FOR CONTROLLING THE SPEED OF AN INTERNAL COMBUSTION ENGINE DURING A DECELERATION PHASE

[75] Inventors: Alain Michel Jean Aubourg, Saint-Jean; Jean-Michel Le Quellec; Christophe Raymond, both of Toulouse, all of France

[73] Assignee: Siemens Automotive S.A., Toulouse-Cedex, France

[21] Appl. No.: 617,919

[22] PCT Filed: Aug. 23, 1994

[86] PCT No.: PCT/EP94/02785

§ 371 Date: Mar. 1, 1996

§ 102(e) Date: Mar. 1, 1996

[87] PCT Pub. No.: WO95/06810

PCT Pub. Date: Mar. 9, 1995

[30] Foreign Application Priority Data

Sep. 1, 1993 [FR] France ................... 93 10423

[51] Int. Cl.⁶ ............... F02D 31/00; F02D 41/08; F02D 41/14
[52] U.S. Cl. ............ 123/352; 123/339.21; 123/361
[58] Field of Search ............ 123/339.2, 339.21, 123/352, 361

[56] References Cited

U.S. PATENT DOCUMENTS

| | | | |
|---|---|---|---|
| 4,958,288 | 9/1990 | Takahashi | 123/352 X |
| 5,213,077 | 5/1993 | Nishizawa et al. | 123/352 |

FOREIGN PATENT DOCUMENTS

| | | |
|---|---|---|
| 0554479 | 8/1993 | European Pat. Off. . |
| 2168830 | 6/1986 | United Kingdom . |
| 2264369 | 8/1993 | United Kingdom . |

OTHER PUBLICATIONS

"Patent Abstracts of Japan", vol. 12, No. 485 (M-777), Dec. 19, 1988, abstract of JP-63-205445.

*Primary Examiner*—Tony M. Argenbright
*Attorney, Agent, or Firm*—Herbert L. Lerner; Laurence A. Greenberg

[57] ABSTRACT

The process assures the correction of the control of an actuator acting on the speed as a function of the error $E = N_c - N$ between a set-point speed ($N_c$) and the actual speed (N), and of the time derivative (E') of this error. A correction ($\Delta u$) for the control of the actuator is derived from the addition of first ($\Delta u_1$) and second ($\Delta u_2$) partial corrections which are functions of the speed error (E) and the time derivative (E') of this error, respectively. These corrections are defined as a function of the relative position of the value of the error, or of the error derivative, with respect to at least two predetermined values of the error (or the derivative of the error), each of which has an associated predetermined value of the partial correction $\Delta u_1$ (or $\Delta u_2$).

12 Claims, 4 Drawing Sheets

METHOD AND DEVICE FOR CONTROLLING THE SPEED OF AN INTERNAL COMBUSTION ENGINE DURING A DECELERATION PHASE

BACKGROUND OF THE INVENTION

1. Field of the Invention

The present invention relates to a process and a device for controlling the speed of an internal combustion engine during a deceleration phase, and more specifically to a process and a device of this type which operate by correcting the control of an actuator which acts on this speed as a function of the deviation between a set-point speed and the actual speed.

Internal combustion engines, particularly those which propel automobiles, run at variable speeds, the control and/or adjustment of which is often delicate, particularly during the deceleration phase. A deceleration phase usually begins when the driver lifts his foot off the accelerator. The object of speed control during such a phase is to assure the return of this speed to a set-point speed, the adjustment of the speed around this set-point speed despite potential disturbances, and the passage through various transitory phases such as a "driven" deceleration phase in which the vehicle runs with an engaged gear box ratio, or an engine start-up phase.

In all of these circumstances, control of the speed is quite delicate, since it is known that the stability of an engine at low speed is difficult to assure and that the reactions of the engine are difficult to model. Moreover, the conditions for the onset of a deceleration phase can vary considerably, for example in relation to the driver's action on the accelerator pedal, the engine coolant temperature, the air temperature, and the potential presence of random disturbances due to the engagement of an electrical (lighting device, ventilator) or mechanical (air conditioner, power steering) device. The speed control must also take into account other constraints associated with the driver's comfort (noise level, vibrations, jerking) and to standards related to the pollution of the environment by the exhaust gases from the engine.

2. Description of the Related Art

At present, in order to assure control of the speed of the engine during a deceleration phase, closed loop control devices with "supervised" PID-type controllers are commonly used. A device of this type is described in German patent Disclosure DE-A-4 215 959, for example, which relies on fuzzy logic to adjust the P, I and D terms of the controller. The result is time-consuming, tedious tuning of the controller in order to adapt it to each type of engine. The PID adjustment is also disadvantageous in that it takes into account only certain aspects of the operation of the engine, and that it is not entirely satisfactory from the standpoint of "robustness", since engine aging or manufacturing tolerances for engines can unfavorably affect the operation of a "supervised" PID controller.

A process for controlling the deceleration speed of an internal combustion engine, which is based entirely on experimental results implemented with the aid of fuzzy logic and is therefore likely, a priori, to have greater robustness and flexibility, is known from SAE document No. 900594, published by the Society of Automotive Engineers of the United States of America. However, the process described requires the utilization of tables and complex operators which take up a lot of space in the memory of the computer used to implement the process, which moreover involves long calculation times.

SUMMARY OF THE INVENTION

The object of the present invention is to provide a process for controlling the speed of an internal combustion engine during a deceleration phase which results in significant reductions both in the memory space necessary in the computer used for this purpose and in the calculation times.

Another object of the present invention is to provide a process of this type which will be satisfactory from four points of view: robustness, resistance to disturbances, ease of adjustment and the pleasure of driving a vehicle propelled by such an engine, in all phases of deceleration.

Yet another object of the present invention is to produce a device for implementing this process.

These objects of the invention, as well as others which will become apparent through a reading of the description which follows, are achieved by means of a process for controlling the speed N of an internal combustion engine in a deceleration phase by correcting the control of an actuator which acts on this speed as a function of the error $E=Nc-N$ between a set-point speed Nc and the actual speed N, and the time derivative E' of this error, which process is remarkable in that it derives a correction u for the control of the actuator from a linear combination of first ($\Delta u_1$) and second ($\Delta u_2$) partial corrections which are functions of the speed error E and the time derivative E' of this error, respectively, which corrections are defined as a function of the relative position of the value of the error, or of the derivative of the error, with respect to at least two predetermined values of the error (or the derivative of the error), each of which has an associated predetermined value of the partial correction $\Delta u_1$ (or $\Delta u_2$).

As will be seen below, the division of the correction into two partial corrections, each of which is a function of only one of the parameters E, E', makes it possible to reduce the quantity of information necessary to the execution of the process, and therefore the memory space required, as well as the calculation time for the correction.

In a first mode of implementation of the process according to the invention, the error E and the derivative E' of this error are fuzzified and processed by separate sets of fuzzy logic rules, so that after defuzzification, they provide the first ($\Delta u_1$) and second ($\Delta u_2$) partial corrections. In a second mode of implementation of the process according to the invention, the functions which link the first ($\Delta u_1$) and second ($\Delta u_2$) partial corrections to the speed error E and the derivative E' of this error, respectively, are defined by characteristic points, and intermediate values for the corrections are obtained by interpolation between these characteristic points.

In order to implement the process according to the invention, a device is used which comprises a) means for issuing a first signal representing the speed error E and a second signal representing the derivative E' of this error, derived from a signal issued by a sensor of the actual speed N of the engine and from a signal representing a predetermined value of the set-point deceleration speed Nc and b) first and second controllers supplied with the first and second signals, respectively, for delivering the first and second partial corrections, and c) means supplied with these partial corrections and with input from the source of a nominal control signal from the actuator for delivering a final control signal for the actuator.

Other characteristics and advantages of the present invention will become apparent through a reading of the description which follows and through an examination of the appended drawing, in which:

DESCRIPTION OF THE PREFERRED EMBODIMENT

The present invention is intended to control an internal combustion engine propelling an automobile during a deceleration phase, the engine being located in a conventional environment of sensors, actuators and electronic means for controlling these actuators. These means usually comprise an electronic computer with input from a variable reluctance sensor, for example, coupled with a gear wheel mounted on the output shaft of the engine, for sending the computer a signal representing the engine rpm (or speed), which computer also receives input from a pressure sensor mounted inside the intake manifold of the engine for providing a signal which represents the pressure of the air admitted into the engine. Other signals originating from engine coolant temperature sensors, air temperature sensors, etc., or from an oxygen probe placed in the exhaust gases of the engine, can also be sent to the computer in the conventional way.

This computer is equipped with the hardware and software necessary to the development and emission of signals for controlling actuators such as a fuel injector, a spark plug ignition circuit or an additional air control valve which short-circuits a throttle valve for controlling the quantity of air which enters the engine through the intake manifold.

It has been decided that as an illustrative and non-limiting example, the control process according to the invention will be described below in terms of a control of the engine by means of an action on the opening time of a fuel injector. However, it will be immediately apparent to one skilled in the art that the same control process could be modeled through an action on the opening of an additional air control valve, on the timing of the opening of a plurality of fuel injectors, on the angle of the opening of the electrically driven throttle valve, or through a combination of actions on these various actuators.

Figure 1:
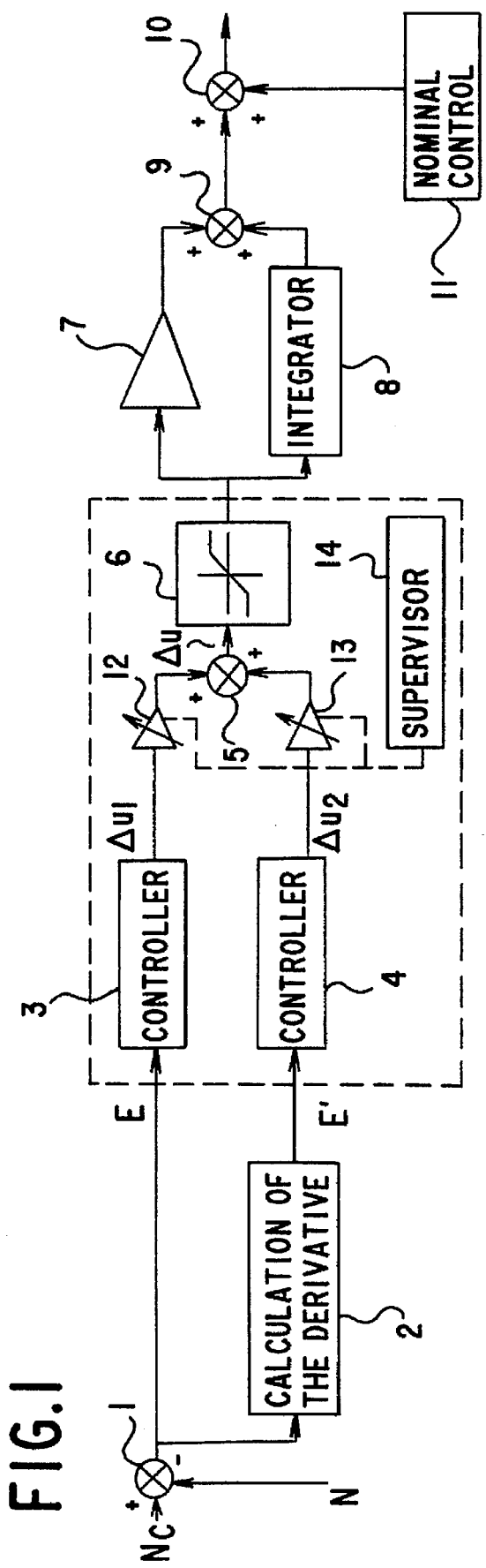
FIG. 1 is a function diagram of the control device according to the present invention.

In FIG. 1 of the appended drawing, it is apparent that the device according to the invention comprises means 1 supplied with signals which represent the actual speed N of the engine and the set-point deceleration speed Nc (Nc=600 rpm, for example) for forming an error signal E=Nc−N. It must be noted that the set-point deceleration speed would not necessarily have to be fixed, but on the contrary, could be a function of various parameters such as the engine coolant temperature, or the possible presence of a disturbance such as the engagement of a mechanical or electrical device.

The device in FIG. 1 also comprises means 2 for forming a signal which represents the time derivative E' of the error E and control means or "controllers" 3 and 4 which are supplied with the signals E and E', respectively, possibly filtered by a first-order recursive filter in order to avoid any "noise" phenomena. The controllers 3 and 4 generate partial correction signals $\Delta u_1$ and $\Delta u_2$, respectively. Advantageously, but only in an optional way, the device may also comprise amplifiers 12, 13 with gains $G_1$, $G_2$, respectively, supplied with the signals $\Delta u_1$, $\Delta u_2$, respectively. The signals $G_1.\Delta u_1$ and $G_2.\Delta u_2$ thus obtained as output from the amplifiers are added at 5 in order to constitute a global correction $\Delta u$ of a nominal control signal for an actuator (not shown), for example a fuel injector in the engine, as seen above.

A supervisor 14 adjusts the gains $G_1$, $G_2$ of the amplifiers 12, 13 in such a way as to vary the relative weight of the corrections $\Delta u_1$ and $\Delta u_2$ in the linear combination $\Delta u$ as a function of, for example, the engine speed at the onset of a deceleration speed phase, and possibly of the load carried by the engine.

The signal $\Delta u$ can be processed in a saturator 6 in order to limit the dynamics of the control, which is conventional. Likewise, the output from the saturator can be parallel processed in an amplifier 7 with a gain $G_1$ and in an integrator 8 so as to form a "direct" correction $G_3.\Delta u$ and an "integral" correction $G_4\int \Delta u.dT$ which are added at 9, then at 10, to a nominal control 11 of the actuator in order to finally constitute the control signal U for this actuator.

Conventionally, the integral correction 8 is provided in order to correct the nominal control when it is no longer suitable due to the application of a continuous or slow variation load to the engine, as is the case when a power steering device is engaged, for example.

Since the processing executed in the blocks 6, 7, and 8 of the diagram in FIG. 1 is optional, from this point forward "u" will mean the correction signal for the nominal control of the actuator, whether or not it has been subjected to this processing.

As will immediately be apparent to one skilled in the art, the control device described above can easily be incorporated into the computer mentioned above, simply by installing the necessary hardware and software into this computer.

It will be noted that in the device according to the invention, up to this point the error E and its derivative E' have been taken into account separately in two distinct controllers 3 and 4. The reasons why this disposition is advantageous with regard to reducing the memory requirements of the computer and the calculation time will now be explained in connection with FIGS. 2 and 3.

Figure 2:
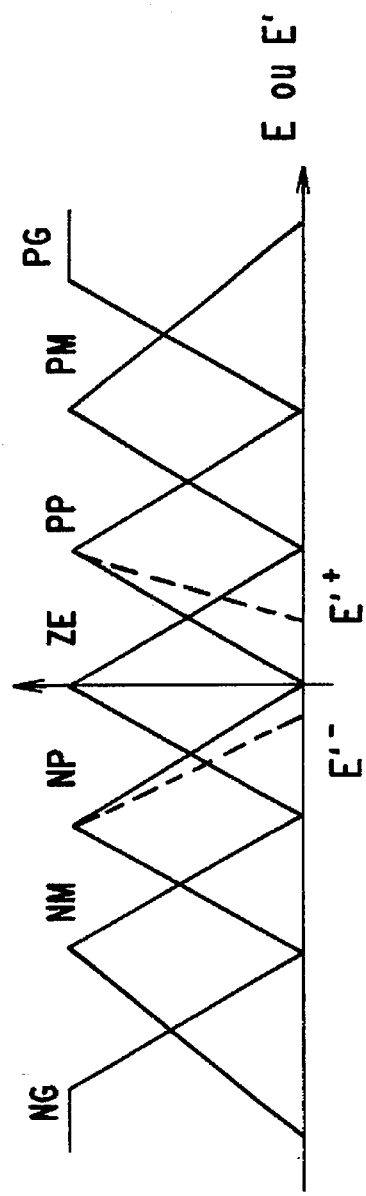
FIGS. 2 and 3 are diagrams which illustrate a first mode of implementation of the process according to the invention, which relies on a control in fuzzy logic.
Figure 3:
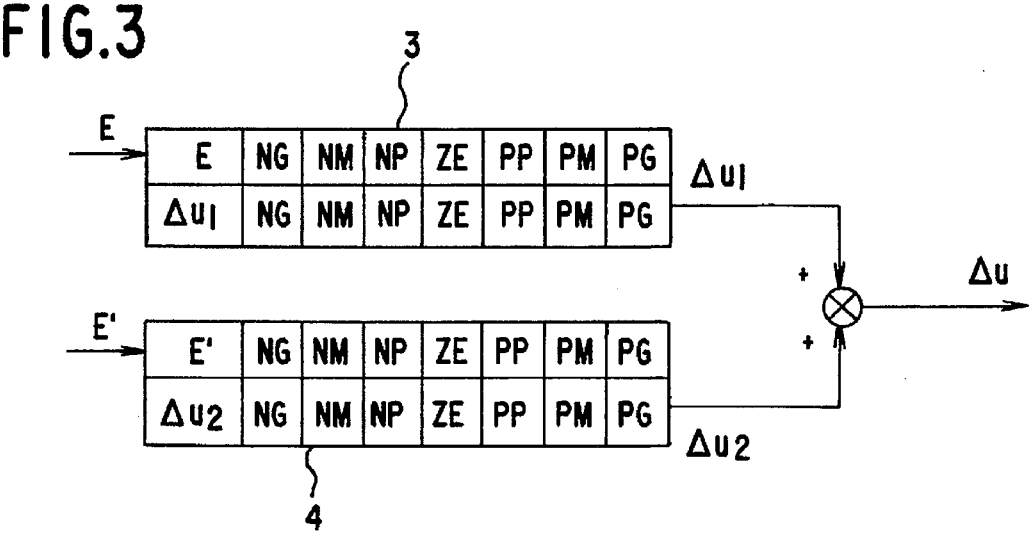

In a first embodiment of the device according to the invention diagrammed in FIG. 3, the controllers 3 and 4 are designed to work in fuzzy logic. For this purpose, the variables E and E' are "fuzzified" using the conventional processes for defining membership classes, for example NG through PG, and functions for membership in these classes which can have triangular shapes as represented in FIG. 2, or other shapes which are well known to one skilled in the art.

The membership classes NG through PG which appear in this figure correspond to the following linguistic labels:

PG: positive large
PM: positive medium
PP: positive small
ZE: zero

NP: negative small
NM: negative medium
NG: negative large

It will be noted in FIG. 2 that the membership functions NP and PP of the variable E', represented by dotted lines, do not meet at the point E'=0. This particular disposition makes it possible to create, in the interval from E'–to E'+, an artificial hysteresis of the partial correction which is a function of the derivative, in order to avoid the disturbances linked to noise at the measurement of E' near its null value. In fact, in this interval, only the membership function ZE (zero) is activated.

Each controller is loaded with seven rules drawn from the experience of one skilled in the art, which translate observations such as:

"The greater the input (E or E'), the greater the correction must be", which produces rules like:

"If the input (E or E') belongs to the class NG, then the correction belongs to the class NG" or "If the input (E or E') belongs to the class PG, the correction belongs to the class PG".

The fuzzy corrections determined in this way are then defuzzified in the conventional way in order to furnish the partial corrections $\Delta u_1$ and $\Delta u_2$ which are added in order to form the global correction $\Delta u$ for the nominal control U.

In this first embodiment in fuzzy logic, the "fuzzification" step for the value of the error (or the derivative of the error) makes it possible to determine a "relative position" of this value with respect to the values which correspond to the maxima of the membership functions representing the classes from which it is derived, a position expressed by the degrees of membership in these classes plotted on the graphs in FIG. 2. The "defuzzification" step determines, as a function of these degrees of membership, the relative position of the control with respect to the control values associated with the control classes, which correspond through the set of rules, to the classes of the error (or the derivative of the error) in question. By thus defining each of the corrections $\Delta u_1$, $\Delta u_2$ relative to two predetermined values according to the invention, the drawbacks of the conventional or "supervised" PID corrections, applied in "segments" of values of E or E' which are derived from the nondefinition of the connections of these segments, are advantageously avoided.

An important advantage of the control process according to the invention presently appears in reference to the control process described in the above-mentioned SAE document No. 900594, which also relies on fuzzy logic. In this document, however, the fuzzy controller used executes a set of rules diagrammed in a table with two entries E and E'. Fuzzifying these inputs into seven membership classes results in a table of 7×7=49 rules. By comparison, the present invention makes use of two controllers each of which executes 7 rules, for a total of 14 rules. It is clear that the memory space required of the computer by these 14 rules is far less than that for the 49 rules in the table according to the teachings of the prior art. The calculation time for the correction of the control is also reduced in proportion to the reduction of the number of rules taken into account during the calculation.

Figure 4:
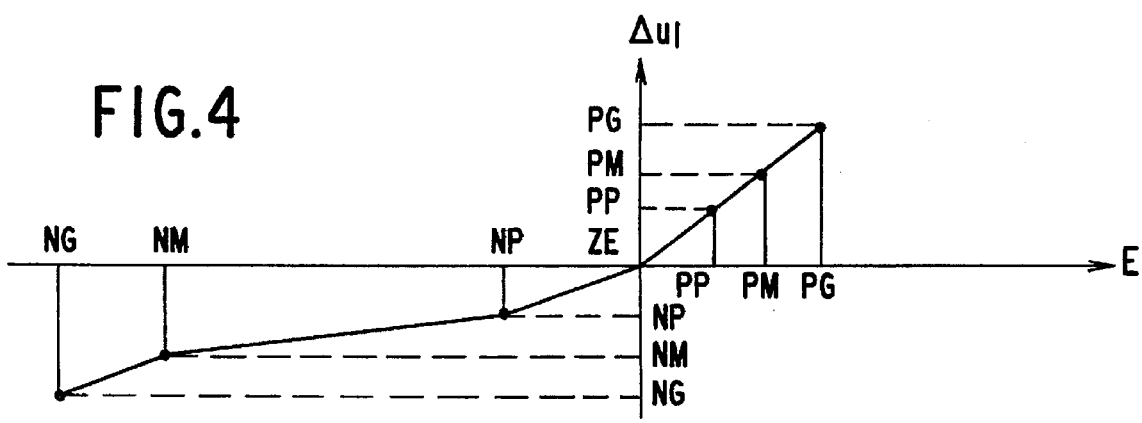
FIGS. 4 and 5 are graphs which illustrate a second mode of implementation of the process according to the invention, which relies on control functions defined by characteristic points.
Figure 5:
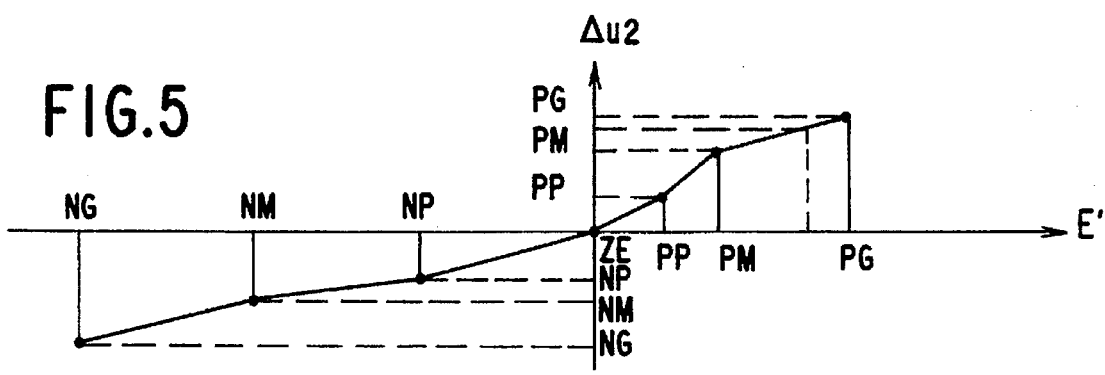

The graphs in FIGS. 4 and 5 illustrate the operating principle of a second embodiment of the device according to the invention, which also takes advantage of the presence in this device of two specialized controllers which are sensitive to the error E and to the derivative E' of this error, respectively. Rather than using fuzzy logic as described previously, the processing of the data known to one skilled in the art from experience is further simplified by formalizing the data in two functions $\Delta u_1 = f(E)$ and $\Delta u_2 = f'(E')$ as shown in FIGS. 4 and 5, respectively. Advantageously, each function is defined by particular points, with linguistic labels NG through PG chosen in reference to those used above in fuzzy logic; the analogy, however, ends there. From these particular points, the controllers derive the outputs $\Delta u_1$ and $\Delta u_2$ from simple interpolations between the particular points which frame a particular entry value E, E', which simplifies and further reduces the calculations as compared to the fuzzy logic calculations suggested in connection with the embodiment in FIGS. 2 and 3.

Incidentally, it will be noted that the values associated with each of the linguistic labels can be different for each of the entry variables E, E'. In particular, the asymmetry of the slopes of the graphs around 0 (ZE) for the variable E', will be noted.

Figure 6:
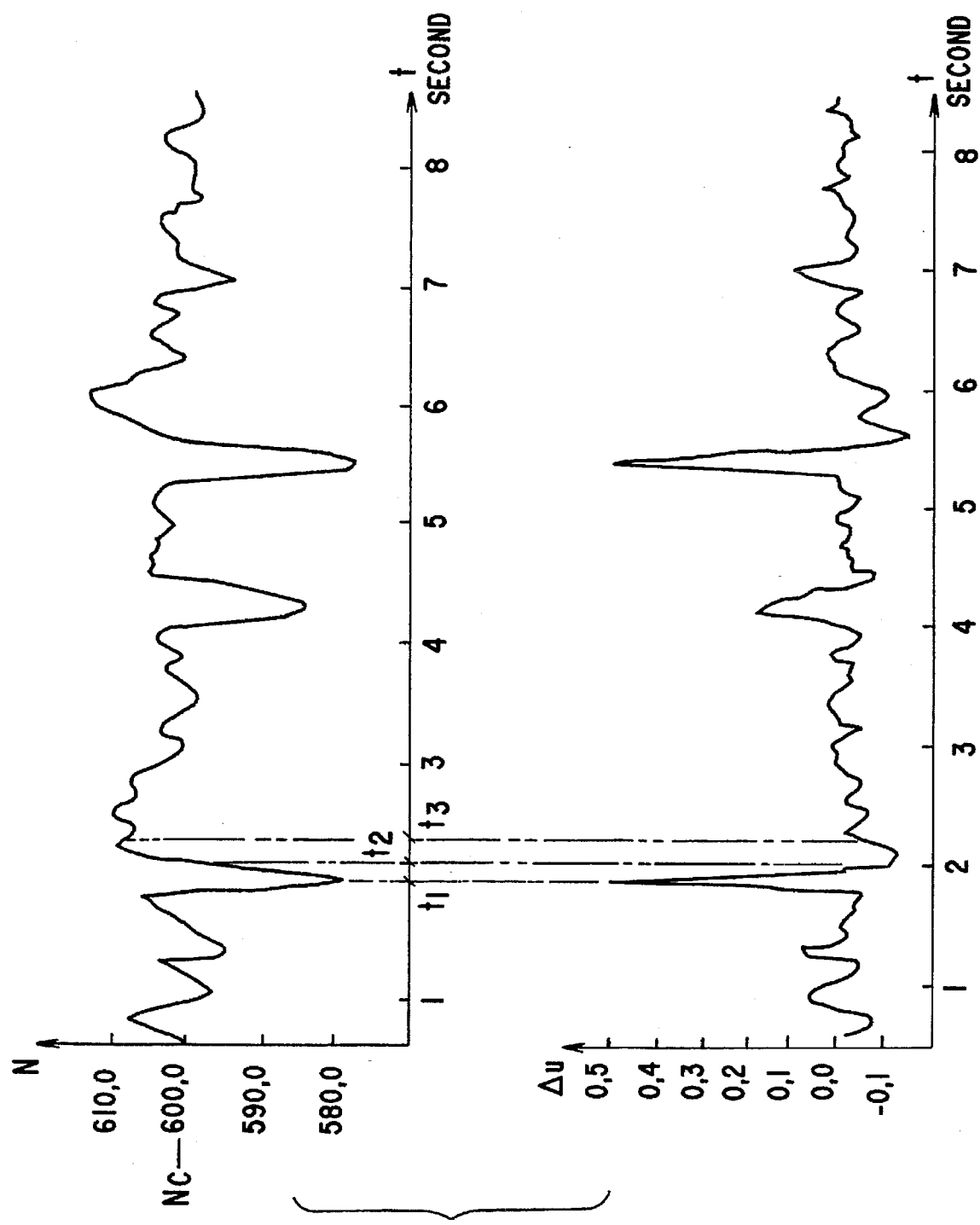
FIG. 6 is constituted by two graphs which illustrate the operation of the process according to the invention in a phase of compensation for a misfire.
Figure 7:
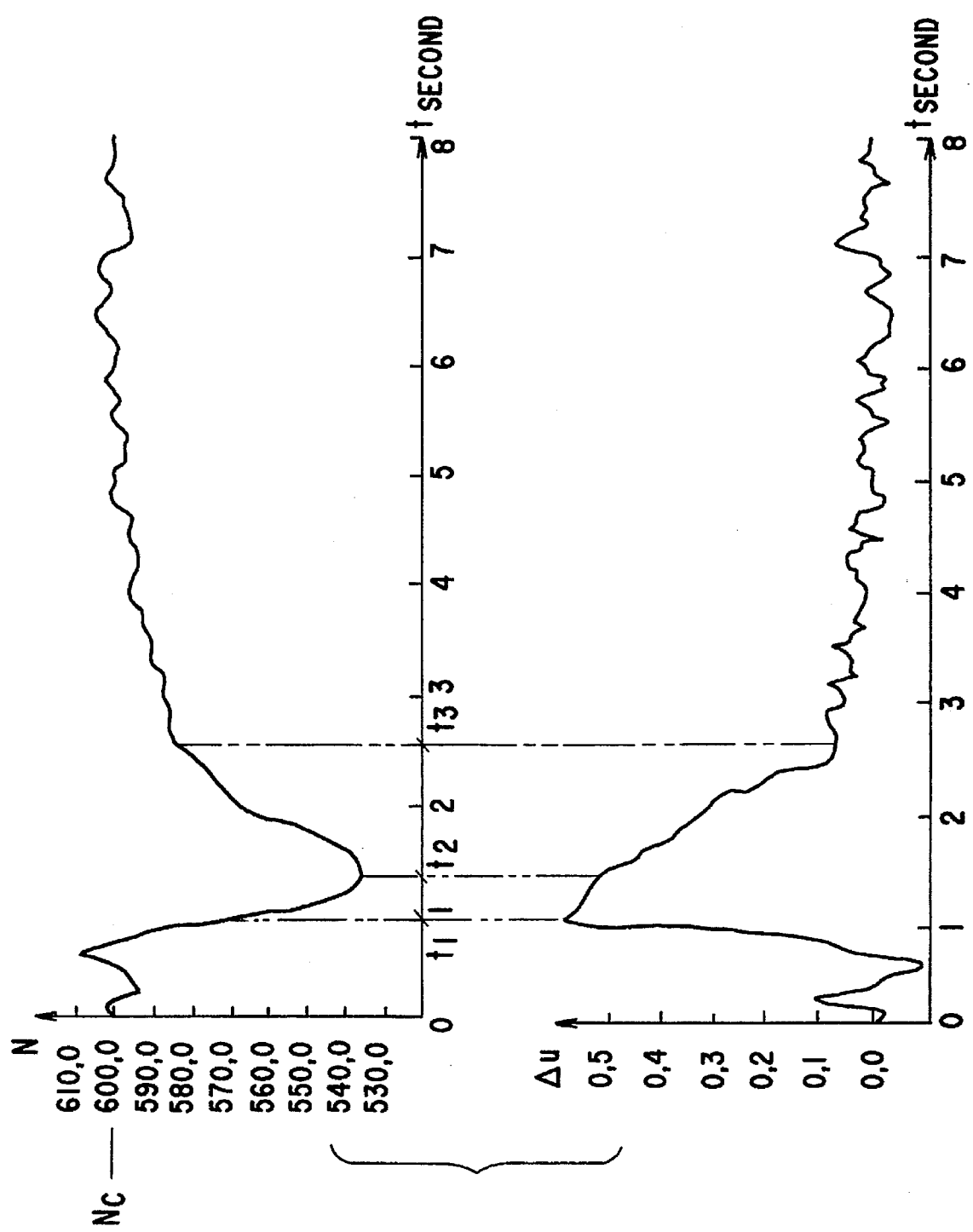
FIG. 7 is constituted by two graphs which illustrate the operation of the process according to the invention during a phase of compensation for a disturbance such as the engagement, during a deceleration phase, of an electrical or mechanical device installed in a vehicle propelled by the internal combustion engine.

The advantages of the present invention will now be illustrated through a description of two typical examples of the operation of the control device, one relating to the reaction of this device to the appearance of a misfire (see the graphs in FIG. 6), the other relating to the reaction of this device to the appearance of a disturbance such as the engagement of an electrical or mechanical device installed in an automobile propelled by the engine (see the graphs in FIG. 7). In both cases, the control process by means of interpolation illustrated in FIGS. 4 and 5 is used and is applied, merely by way of example, to an internal combustion engine of the "two stroke" type supplied with a suitably lean air/fuel mixture during the deceleration adjustment phase.

The result is unstable operation at low speed, essentially due to incomplete or absent combustion of the air/fuel mixture present in the cylinders of the engine. It is said in this case that misfires are observed. In a misfire, a random phenomenon, a drop in the speed N, which may cause the engine to stall, is observed. At the moment of this drop in speed (time $t_1$ in the graphs N(t) and $\Delta u(t)$ in FIG. 6), the device according to the invention strongly increases the injection time in order to allow the restoration of the speed N. In reading the graphs $\Delta u(t)$ in $\Delta u_2$ FIGS. 6 and 7, it will be noted that $\Delta u$ is a standardized correction, varying between −1 and +1. From the moment the restoration of the speed has occurred (time $t_2$, FIG. 6), it is necessary to avoid excessively reducing the injection time, so as not to risk encouraging another misfire. Then, a slight overshooting of the set-point speed due to fuel-rich combustion is observed (time $t_3$, FIG. 6), but in this case there is no need to correct the injection time appreciably. This type of combustion is due to the surplus of fuel injected at the preceding times.

In order to obtain this performance, the characteristic points of the function represented in FIG. 5 are asymmetrical around the point 0 (ZE) so as to generate a control $\Delta u_2$, which is also asymmetrical. At time $t_2$ (FIG. 6), the derivative of the error is seen as positive medium (PM), thus generating a positive medium (PM) correction $\Delta u_2$. On the other hand, at time $t_2$, although the derivative of the error has the same amplitude in absolute value as at time $t_1$, it will be seen as being negative small (NP), thus generating a negative small (NP) correction $\Delta u_2$. During the entire misfire, the error remains very small in absolute value, as does the correction $\Delta u_1$ (see FIG. 4), with the essentials of the correction $\Delta u$ of the control of the injection time in this case coming from the controller 4 with the output $\Delta u_2$ (see FIG. 5).

Refer now to FIG. 7 of the appended drawing in which the graphs N(t) and $\Delta u(t)$ illustrate the correction according to the invention of a drop in the speed N due to the occurrence, during a deceleration phase, of the engagement of a mechanical (a power steering device, for example) or electrical (air conditioner, etc.) device.

The disturbance occurs at time $t_1$. Roughly the same initial conditions for the speed error and the derivative of this error exist as were found during the appearance of a misfire. The reaction of the device according to the invention therefore consists of strongly increasing the injection time in such a way that a rapid reaction prevents the engine from stalling.

At time $t_2$, the progressive restoration of the engine speed begins, but in this case a strong correction $\Delta u$ of the injection time is maintained so that this restoration can proceed. At time $t_3$, the speed has practically regained the set-point value $N_c$ and the device then reduces the correction of the injection time in order to avoid overshooting this set-point value.

It will be observed that, compared to the compensation for a misfire (see FIG. 6), the compensation for the disturbance is slower. The correction u of the injection time therefore chiefly involves the speed error E (see graph in FIG. 4), and therefore the controller 3, while the derivative E' remains very low during the increase in speed.

The characteristic points of the graph in FIG. 4 are adjusted so as to assure the correction of the injection time in this situation. Thus, at the occurrence of the disturbance, the error E is situated around the point PM, and the controller responds to this input with a partial correction $\Delta u_1$ at the level PM. The characteristic point PP of the error E is adjusted as a function of the speed error at time $t_3$ so that the partial correction $\Delta u_1$ is at the level PP when the speed N approaches the set-point speed $N_c$.

The present invention contributes numerous advantages. In addition to the above-mentioned reductions in required memory space and calculation time, the control strategies developed by the process according to the invention also prove to be quite satisfactory with regard to robustness, resistance to disturbances, ease of adjustment and driving comfort.

These advantages are specifically derived from the capability provided by the process according to the invention for breaking down the operation of the engine, at the deceleration speed, into four very distinct situations:

1) onset of deceleration adjustment, uncoupled engine (large E, E'), 2) engine driven by the vehicle (large E, small E')

3) stabilized deceleration (small E, E')

4) occurrence of a misfire or a disturbance (small E, large E'), each of these situations being able to be processed by means of different adjustments of the characteristic points on the graphs in FIGS. 4 and 5 or and 5 or by "fuzzy" control rules arranged in the tables in FIG. 3.

It is understood that the invention is not limited to the embodiment described and illustrated, which is given only by way of example. Specifically, it encompasses the control of any internal combustion engine, not just that of a two stroke engine supplied with a "lean" mixture.

We claim:

1. A method of controlling the speed of an internal combustion engine during a deceleration phase, wherein the speed of the engine is affected with a controlled actuator connected thereto, the method which comprises:

defining a speed error $E=N_c-N$, where $N_c$ is a set-point speed, and N is an actual speed of the engine, and calculating a time derivative E' of the speed error E;

deriving a correction for a control of the actuator from a linear combination of a first partial correction and a second partial correction, wherein the first partial correction is a function of the speed error E and the second partial correction is a function of the time derivative E' of the speed error, and said partial corrections being defined as a function of a relative position of a value of the speed error E and of the time derivative E' thereof, respectively, relative to at least two predetermined values of the speed error E and of the time derivative E' thereof, each of which has an associated predetermined value of the partial corrections; fuzzifying the speed error E and the time derivative E' thereof, processing the speed error E and the time derivative E' with separate sets of fuzzy logic rules, subsequently defuzzifying and producing the first and second partial correction;

filtering disturbances linked to noise at the measurement of the derivative near its null value, by fuzzifying the time derivative of the speed error in the fuzzifying step with a set of membership classes which do not overlap within a predetermined interval of values of E' around E'=0; and correcting a control of the actuator and thereby affecting the speed of the engine as a function of the speed error E and of the time derivative E' thereof.

2. The method according to claim 1, which comprises defining the functions linking the first and second partial corrections to the speed error and to the time derivative, respectively, with characteristic points, and obtaining intermediate values of the partial corrections by interpolation between the characteristic points.

3. The method according to claim 1, which comprises saturating the correction for the control of the actuator for limiting the dynamics of the correction.

4. The method according to claim 3, which further comprises processing the saturated correction obtained in the saturating step with means for forming a direct correction and an integral correction, and adding a sum of the direct and integral corrections to a nominal control of the actuator for defining a control signal for the actuator.

5. The method according to claim 1, wherein the correction of the control of the actuator has the form:

$$\Delta u = G_1 \cdot \Delta u_1 + G_2 \cdot \Delta u_2$$

where $G_1$ and $G_2$ are coefficients which are adjustable as a function of operating parameters of the engine.

6. A device for controlling the speed of an internal combustion engine during a deceleration phase, wherein the speed of the engine is affected with a controlled actuator connected thereto, comprising:

a) a device receiving a sensor signal representing an actual speed N of the engine and a signal representing a predetermined set-point speed $N_c$, said device defining a speed error $E=N_c-N$ as a first signal, and calculating a time derivative E' of the speed error E as a second signal;

b) a first fuzzy logic controller receiving the first signal and forming a first partial correction, a second fuzzy logic controller receiving the second signal and forming a second partial correction; a device for forming a linear combination of the first partial correction and the second partial correction and deriving a correction for a control of the actuator from the linear combination; means for filtering disturbances linked to noise at the measurement of the derivative near its null value, by fuzzifying the time derivative of the speed error with a set of membership classes which do not overlap within a predetermined interval of values of E' around E'=0; and c) means receiving the correction derived in the linear combination and a signal from a source of a nominal control signal for the actuator, and issuing a corrected final control signal for the actuator and thereby setting the speed of the engine as a function of the speed error E and of the time derivative E' thereof.

7. The device according to claim 6, wherein said first and second controllers include a memory for storing the functions which link the speed error and the time derivative thereof to the first and second partial corrections, respectively.

8. The device according to claim 7, wherein the memory store characteristic points of the functions, and said controllers comprise means for interpolating between the characteristic points.

9. The device according to claim 6, wherein said means issuing the final control signal for the actuator form a signal $$\Delta u = G_1 . \Delta u_1 + G_2 . \Delta u_2$$

where $G_1$ and $G_2$ are coefficients, and including a, supervisor for adjusting the coefficients $G_1$ and $G_2$ as a function of operating parameters of the engine.

10. The device according to claim 6, wherein said means include a saturator for saturating the linear combination.

11. The device according to claim 10, wherein said means further comprise a correction device receiving an output from said saturator, said correction device generating a direct correction and an integral correction added to the nominal control signal for the actuator for defining the final control signal for the actuator.

12. The device according to claims 6, wherein the actuator controls a parameter selected from the group consisting of an opening of an additional air control valve, an opening time for a fuel injector, a timing of an opening of a plurality of fuel injectors, and an opening angle of an electrically driven throttle valve.

* * * * *